Figure 1:
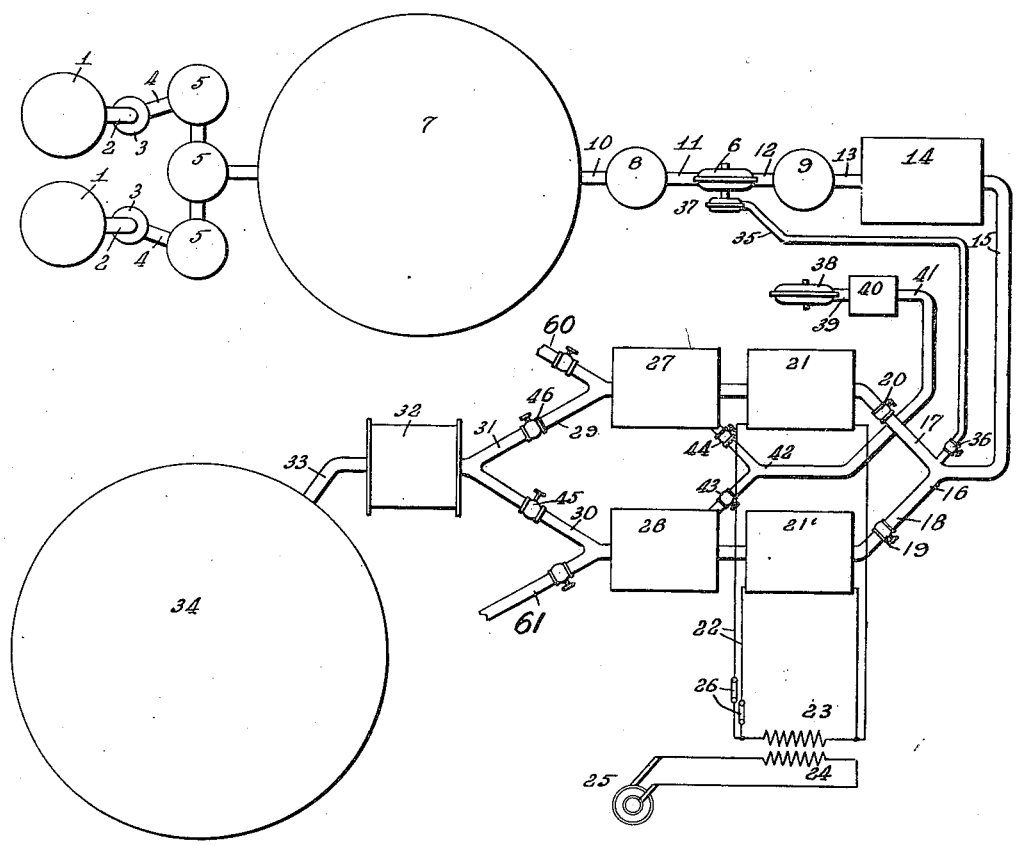

E. L. HALL.
PURIFICATION OF GASES.
APPLICATION FILED APR. 4, 1913.

1,120,475.

Patented Dec. 8, 1914.

Witnesses
H. C. Robinette
George McDaniel

Inventor
Elmon L. Hall
By K. P. McElroy
Attorney

UNITED STATES PATENT OFFICE.

ELMON L. HALL, OF PORTLAND, OREGON, ASSIGNOR TO SECURITY SAVINGS AND TRUST COMPANY, OF PORTLAND, OREGON, A CORPORATION OF OREGON.

PURIFICATION OF GASES.

1,120,475.   Specification of Letters Patent.   Patented Dec. 8, 1914.

Application filed April 4, 1913. Serial No. 758,870.

*To all whom it may concern:*

Be it known that I, ELMON L. HALL, a citizen of the United States, residing at Portland, in the county of Multnomah and State of Oregon, have invented certain new and useful Improvements in Purification of Gases, of which the following is a specification.

This invention relates to purification of gases; and it relates more particularly to the purification of gases from sulfur contained therein in various forms; and it comprises a process of purifying gases, more especially combustible gases, wherein the gas is caused to travel through a high tension electric discharge to convert contained impurities, especially sulfur compounds, into more easily removable forms, and such altered impurities are thereafter removed from the gas by suitable purifying means; and it comprises apparatus suitable for carrying out the said process; all as more fully hereinafter set forth and as claimed.

In the purification of gases, particularly of gases to be employed for heating and illuminating purposes, it is difficult to effect complete removal of sulfur compounds which are practically always present in greater or less proportions in the crude gas. Sulfur may exist in such gases in various forms, such as hydrogen sulfid, carbon bisulfid, and, in many cases, as more or less complex organic compounds of sulfur. The particular nature of such sulfur compounds in any given instance depends largely on the raw materials from which the gas is made,—coal, coke, oil etc., and upon the method of gas manufacture. In any case, where the gas is to be used for illuminating purposes or as a high grade fuel, it is essential that sulfur compounds be eliminated from it as far as possible, since upon combustion, such compounds yield products such as sulfur dioxid, for example, which are poisonous, and which, especially in the presence of moisture, form active corroding agents.

The usual method of removing sulfur compounds from gas comprises employment of purifiers or absorbers in which the active purifying agent is iron oxid in a hydrated form. The gases carrying sulfur compounds are passed through layers of shavings or chips on which the hydrated iron oxid is deposited, and the hydrogen sulfid in the gas is taken up by the oxid. In this way the gas may be very largely freed from hydrogen sulfid. Other compounds of sulfur, and particularly organic compounds which may be conveniently designated as being of the carbon bisulfid type, are not absorbed however by the iron oxid purifying materials. Some removal of these organic compounds is effected by the use of lime; but even with the greatest precaution and under the most favorable circumstances, it is practically impossible to free gases entirely from such complex constituents. This is especially the case with gases made from California and Texas petroleums whose sulfur content is excessively high. Crude gas made from such oils contains hydrogen sulfid which, as before stated, is comparatively easy to remove; but it also contains relatively large quantities of carbon bisulfid or other more or less complex organic sulfur compounds from which it has been heretofore impossible in practice to free the gas to the described extent without employing expensive and time consuming operations.

I have discovered that if gas containing difficultly removable sulfur compounds be subjected to the influence of a high potential electric discharge in connection with suitable dielectrics, the sulfur compounds are thereby converted into hydrogen sulfid and other compounds of sulfur which can be removed from the gas by any of the usual processes employed for the removal of hydrogen sulfid. The type of electric discharge employed is advantageously that known as the silent discharge. The gas to be treated with the electric discharge may have received a preliminary purifying treatment for the removal of hydrogen sulfid and other easily removable sulfur compounds; and as a rule this preliminary purification is best employed. The presence of hydrogen sulfid much retards the formation of further quantities of hydrogen sulfid by breaking down organic sulfur compounds; *i. e.*, it exercises a specific protective influence on such organic sulfur compounds. Where a preliminary purification is employed the conversion of the residual sulfur compounds in the gas into hydrogen sulfid is found to be more efficient. I may however treat the gas without any such preliminary purification. In either case, the gas, after having passed through the electric discharge is led to suitable purifiers for the removal of hydrogen, sulfid etc. If the gas after this treatment still contains sulfur compounds, the treatment with the electric discharge followed by absorption of hydrogen sulfid may be repeated as many times as it is necessary to procure commercially pure gas.

In order to prolong the life or activity of the hydrated iron oxid or other purifying material, it has been customary in the prior art to admit small quantities of air with the gas to be purified, whereby the iron sulfid formed by the reaction of iron oxid with hydrogen sulfid is oxidized, yielding free sulfur and regenerating iron oxid. In this way a kind of simultaneous revivification of the purifying material is secured, rendering it unnecessary to remove such material from the purifier so frequently for complete revivification as would be otherwise necessary. This procedure has certain drawbacks, however, particularly in that it introduces into the gas quantities of nitrogen which of course is inert and merely a diluent in the finished gas. The volume of nitrogen thus introduced is of course about four times that of the oxygen, where air is employed. I have found that by introducing small quantities of air into the gas prior to the treatment with the electric discharge, the ozone formed while the gas is passing through the silent discharge greatly intensifies the revivifying effect of the air in the subsequent passage of the gas through the purifying materials. As a result, the amount of air required to be mixed with the gas to produce this revivifying effect, is less than that heretofore necessary; and consequently the gas after purification contains a less proportion of nitrogen.

While the present process is of broad application, it is particularly adapted to the manufacture of illuminating gas, in which the removal of sulfur compounds must be effected as completely as possible. In order to illustrate the process, I shall describe a specific embodiment of the process as applied to the manufacture of illuminating gas from oil, such as a California or Texas petroleum of high sulfur content. In manufacturing gas of this type, oil is supplied to a generator of suitable construction and usually comprising a highly heated retort, brick checker work, or other appropriate means for cracking the oil. The oil coming in contact with the hot surfaces of the retort or checker work is cracked or decomposed into simpler constituents of which a large proportion may be gaseous. The gas thus obtained is then cooled in any appropriate manner for the removable of easily condensible constituents, and may then be passed through suitable washers and scrubbers for the removal of impurities of various kinds. The gas is then passed through a purifying apparatus containing hydrated iron oxid and the greater part of the contained hydrogen sulfid is here absorbed, carbon bisulfid and other organic sulfur compounds passing on with the gas leaving the purifier. This partially purified gas is now caused to pass between electrodes connected to a source of high tension alternating current, and separated from immediate contact with the gas by means of a suitable dielectric such as glass. The current supply to these electrodes may conveniently be at a voltage of between ten thousand and fifty thousand volts, depending upon the distance apart of the electrodes and upon other conditions involving the size and construction of the apparatus employed. Other voltages, even higher, may of course be employed where conditions require.

The gas after passing through the electric discharge is led to a second iron oxid purifier where the hydrogen sulfid or other absorbable sulfur compounds formed in the electrical treatment, may be removed. The gas leaving this second purifier may, in some instances, still contain some sulfur compounds which have resisted removal in the purification steps. In order to further purify the gas, it may therefore be again passed through an electric discharge, either in the same apparatus as before, or in a second apparatus of similar description, after which the hydrogen sulfid is removed in a suitable purifier. The purifier employed after passing the gas through an electrical discharge may, in each case, be either the same purifier as that through which the gas was previously passed, or it may be a second and separate purifier as in this specific example just described.

As before stated, the admixture of a minimal quantity of air or other suitable gas containing oxygen with the illuminating gas prior to the passage of the illuminating gas through the electrical discharge, is advantageous by reason of the revivifying effect subsequently produced in the iron oxid purifier.

The process described may be carried out in various forms of apparatus in which a high potential discharge chamber or gas passage is followed by a suitable purifier. Advantageously the apparatus may be so constructed that the gas is alternately subjected to a high potential discharge and then purified from the resulting hydrogen sulfid, both treatments being repeated a sufficient number of times to give a gas of the desired degree of purity.

In the accompanying drawings I have shown more or less diagrammatically typical embodiments of apparatus suitable for carrying out the process of the present invention.

Figure 2:
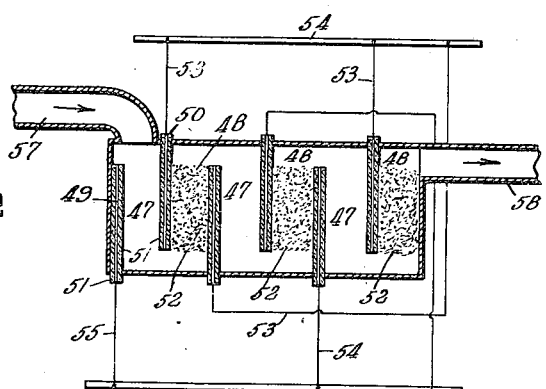

In these drawings Figure 1 is a diagrammatic layout of a complete gas plant embodying the present invention and Fig. 2 is a longitudinal section of a special type of combined converter and purifier which may conveniently be employed.

Referring to the drawings, gas generators 1 of any suitable type are connected by means of dip pipes 2 with wash-box 3, the dip pipes extending to near the bottom of wash-box. Conduit 4 leads gas from the wash-box to scrubbers 5 where tar which has escaped deposition in the wash-box is separated by suitable cooling means. Exhauster 6 draws gas from the relief holder 7 and scrubber 8 and forces it through suitable washer 9, all these being connected by conduits 10, 11 and 12. The gas leaving the washer passes through conduit 13 to a purifier 14 containing hydrated iron oxid for absorbing the hydrogen sulfid from the gas. Conduit 15 leads from the hydrogen sulfid purifier to a Y 16 having branches 17 and 18 which are provided, respectively, with suitable valves 19 and 20. The branches of the Y lead to carbon bisulfid converters 21 and 21', the two converters being similar in structure. Each converter comprises a suitable chamber containing electrodes of opposite sign having connections 22 to the secondary 23 of a transformer, to the primary 24 of which power is supplied from a suitable alternating current generator 25. Switches 26 may be provided for putting either converter into or out of operation. Following the converters 21 and 21' are secondary hydrogen sulfid purifiers 27 and 28, respectively, containing purifying material such as iron oxid. From these secondary purifiers conduits 29 and 30 pass purified gas and discharge the same through Y branch 31 and station meter 32 into conduit 33, whence the gas passes to any convenient place such as holder 34. Valved waste gas ports 60 and 61 are provided for 27 and 28 respectively for use in regeneration of the contained oxid purifier. The air inlet 35 valved or dampered at 36 joins branch conduit 16 at a point in advance of its entry into the $CS_2$ converters 21 and 21' and is supplied by air fan 37 which is direct connected to exhauster 6. An alternative arrangement shows fan 38 with pipe connection 39 to small ozonizer 40, conduit 41, Y branch 42, valves 43 and 44 to secondary purifiers 27 and 28.

The method of employing the described apparatus in carrying out the present process is apparent from the foregoing. Gas generated in the generators passes into the wash-box where the heavier tarry matters are deposited, and the uncondensed portions of the gas pass thence to the scrubber where they are considerably cooled and where further quantities of tarry or other condensible matters are separated. The cooled gas is then drawn from the relief holder by the exhauster 6 and is forced through the succeeding train of washers and purifiers whereby the gas is freed from physical impurities, and all of the hydrogen sulfid. The gas leaving this train of purifying apparatus through conduit 15 still contains carbon bisulfid and other organic compounds of sulfur which are not removable by ordinary methods of purification.

The gas passes from conduit 15 through 17 or 18 into one or the other of the high tension converters which, as shown, are conveniently arranged in parallel either for alternate or simultaneous operation. Assuming the converters to be operated alternately, and asuming 21' to be temporarily out of the purifying phase, the gas passes from conduit 15 through 17 into 21, where it is subjected to the influence of a silent discharge. Carbon bisulfid and other more or less complex sulfur compounds in the gas are broken down by this discharge into simpler forms, of which hydrogen sulfid is typical. Leaving the converter 21 the treated gas passes into purifier 27 where hydrogen sulfid and other absorbable sulfur compounds are taken up by the iron oxid. Through conduit 29 the purified gas from the iron oxid purifier passes into station meter 32 and thence by way of 33 to the gas holder.

During the operations just described, converter 21' and purifier 28 have been temporarily cut out of the gas circulating system, valves 19 and 45 having been closed. Valve 43 has however been open and the fan 38 has been forcing air through the ozonizer 40, in which a high potential discharge is being maintained. Air entering through pipe 39 is ozonized in the ozonizer, and passes into the iron oxid purifier 28 where it reacts with iron sulfid formed in a previous absorption phase, to regenerate iron oxid and deposit free sulfur. Waste gases pass to exit through 61. The air thus passed through the purifier accomplishes this revivifying most efficiently by reason of its ozone content. When purifier 27 has become somewhat foul, it may be cut out of system, together with converter 21, and the purifying material in 27 be revivified in the manner just described for the other unit of the apparatus. During this operation, converter 21' and purifier 28 are of course made a part of the main circulating system.

Instead of operating the parallel units alternately they may of course be operated simultaneously, a small amount of air being permitted to enter continuously through 35 and 36, and valves 43 and 44 being closed, such air being furnished by air fan 37 which operates proportionately with exhauster 6.

Instead of using secondary purifiers 27 and 28, the converters and secondary purifiers may be combined as illustrated in Fig. 2 where the apparatus consists of a plurality of alternating converting and purifying chambers 47 and 48 respectively. Electrodes 49 are of like polarity, while electrodes 50 are of opposite polarity. The electrodes are covered with a suitable dielectric material 51 such as glass. Each converting chamber is thus provided with opposite walls formed by electrodes of unlike polarity; while the purifying chambers containing iron oxid or the like 52 have opposite walls formed by electrodes of like polarity. Electrodes 50 are provided with leads 53 connecting them with a common supply conductor 54; while electrodes 49 have leads 55 connecting them with a common conductor 56. Conductors 54 and 56 lead to the secondary of a high tension step-up transformer, not shown. The apparatus is provided with gas inlet 57 and gas outlet 58.

In using the combined converter and purifier just described, gas enters at 57 and is subjected alternately to the influence of a high potential discharge and to a purification by passage through iron oxid. As many pairs of converting and absorbing chambers may be provided as are necessary to effect the desired purification. As shown, the electrodes are in the form of plates arranged like baffles, alternate plates being supported on the bottom of the chamber and extending to near its top; while the other electrodes depend from the top of the chamber to near its bottom. The gas is thus compelled to follow a sinuous course in passing through the apparatus.

Where the combined converters and purifiers are employed, the separate purifiers 27 and 28 shown in Fig. 1 may of course be dispensed with. The revivification of the purifying materials in the combined apparatus may be effected contemporaneously with the passage of the gas to be purified, or it may be effected in a separate operation as previously described for the alternating method of using the apparatus. The materials in the purifier 14 may also be revivified by ozonized air in the same manner as described for the secondary purifiers; and to this end several of such primary purifiers may be employed for alternate operation. These may be connected to the ozonizer 40; or separate means for ozonizing the revivifying air to be continuously admitted from air fan 37 may be provided.

The apparatus described is adapted, without material altering, for treating other combustible gases such as water gas, coal gas, coke oven gas, and the like.

What I claim is:
1. The process of purifying gases which comprises subjecting a gas to the influence of a high tension electric discharge to alter the character of a contained impurity, and thereafter treating the gas to remove the altered impurity.

2. The process of purifying a combustible gas which comprises subjecting such gas to the influence of a silent electric discharge and absorbing impurities from the gas thus treated.

3. In a process of purifying a combustible gas, the step which comprises subjecting such gas to the influence of a silent electric discharge.

4. The process of purifying a combustible gas which comprises altering the character of sulfur compounds contained therein by means of a silent electric discharge, and removing altered sulfur compounds from the gas.

5. The process of purifying a combustible gas which comprises partially removing sulfur compounds from such gas, altering the character of sulfur compounds still remaining therein by means of a silent electric discharge, and removing altered sulfur compounds from the gas.

6. The process of purifying a combustible gas which comprises removing the more readily removable sulfur compounds from such gas, treating the resulting partially purified gas with a silent electric discharge to render more readily removable the sulfur compounds still remaining in the gas, and again removing sulfur compounds from the gas.

7. The process of purifying a combustible gas which comprises treating such gas with a silent electric discharge to convert difficultly absorbable sulfur compounds into hydrogen sulfid, removing hydrogen sulfid from the gas, and repeating the above operations until the desired degree of purification has been attained.

8. The process of purifying a combustible gas, which comprises admixing a small proportion of air with such gas, subjecting the mixture to the influence of a silent electric discharge, and passing the resulting mixture through an iron oxid purifying mixture to remove hydrogen sulfid and simultaneously to effect revivification of the purifying mixture.

9. Apparatus for purifying combustible gases comprising, in combination, means for treating such gas with a silent electric discharge, and means for removing impurities from the gas so treated.

10. Apparatus for purifying combustible gases comprising, in combination, means for treating such gas with a silent electric discharge, and an iron oxid purifier arranged to receive the treated gas.

11. Apparatus for purifying combustible gases comprising a plurality of chambers, each provided with means for maintaining therein a high potential electric discharge, alternating with a plurality of purifying chambers, said chambers being serially connected.

In testimony whereof, I affix my signature in the presence of two subscribing witnesses.

ELMON L. HALL.

Witnesses:
 WM. H. BARTON,
 ARCHIE N. HOSNER.